United States Patent
Chen et al.

(10) Patent No.: US 11,152,031 B1
(45) Date of Patent: Oct. 19, 2021

(54) SYSTEM AND METHOD TO COMPRESS A TIME FRAME OF ONE OR MORE VIDEOS

(71) Applicant: CLIPr Co., Kirkland, WA (US)

(72) Inventors: Humphrey Chen, Norwood, NJ (US); Cindy Chin, New York, NY (US); Aaron Sloman, Costa Mesa, CA (US)

(73) Assignee: CLIPr Co., Kirkland, WA (US)

( * ) Notice: Subject to any disclaimer, the term of this patent is extended or adjusted under 35 U.S.C. 154(b) by 0 days.

(21) Appl. No.: 17/317,647

(22) Filed: May 11, 2021

(51) Int. Cl.
| | |
|---|---|
| *G11B 27/031* | (2006.01) |
| *G06F 3/0482* | (2013.01) |
| *G06K 9/00* | (2006.01) |
| *G06F 16/738* | (2019.01) |
| *G11B 27/06* | (2006.01) |
| *G11B 27/10* | (2006.01) |
| *G11B 27/00* | (2006.01) |

(52) U.S. Cl.
CPC .......... *G11B 27/031* (2013.01); *G06F 3/0482* (2013.01); *G06F 16/738* (2019.01); *G06K 9/00751* (2013.01); *G06K 9/00765* (2013.01); *G11B 27/005* (2013.01); *G11B 27/06* (2013.01); *G11B 27/10* (2013.01)

(58) Field of Classification Search
CPC ..... G11B 27/031; G11B 27/005; G11B 27/10; G06F 16/738; G06F 3/0482; G06K 9/00751; G06K 9/00765
See application file for complete search history.

(56) References Cited

U.S. PATENT DOCUMENTS

| | | | |
|---|---|---|---|
| 2012/0076357 A1* | 3/2012 | Yamamoto | H04N 21/233 382/103 |
| 2018/0341705 A1* | 11/2018 | Kim | G06K 9/00765 |
| 2021/0117691 A1* | 4/2021 | Shen | G06T 7/90 |

* cited by examiner

*Primary Examiner* — Mishawn N. Hunter
(74) *Attorney, Agent, or Firm* — Lowenstein Sandler LLP

(57) ABSTRACT

System and method to compress multiple videos are provided. the system includes a video retrieve module configured to retrieve videos from a video library database; a video selection module configured to select videos by a user upon viewing the plurality of videos; a video clipping module configured to clip each of the multiple videos into a multiple video clips based on features with assigned importance levels, and to select one or more video clips by the user upon viewing the multiple video clips; a video summarization module configured to create a video summary, a video editing module configured to operate multiple video clips from the video summary on receiving a feedback from the user, to generate a modified video summary to compress the multiple videos. a video time calculator module configured to calculate total time eliminated; a video timer module configured to set a time frame enable the modified video summary to be played.

10 Claims, 5 Drawing Sheets

SYSTEM AND METHOD TO COMPRESS A TIME FRAME OF ONE OR MORE VIDEOS

FIELD OF INVENTION

Embodiments of a present disclosure relate to creating a video summary, and more particularly, to a system and method to create a video summary upon compressing a time frame of one or more videos.

BACKGROUND

Video summary or a video synopsis is a presentation of events that enables the review of hours of video footage in a pre-defined amount of time. More specifically, video summary can be described as a brief presentation of contents by merging multiple images or videos. In a conventional approach, a user may create the video summary by manually editing the multiple videos and syncing multiple edited video frames to generate the video summary. In a situation, where a user is wants to understand just the gist of the video summary due to various reasons such as time constraint, the user needs to either run through the video summary in a random fashion. Such limitations can limit the user from acquiring important content from the video summary and can skip viewing the crux of the video, thereby making the conventional approach less reliable and less efficient especially in specific circumstances. Also, due to the intervention of the human efforts, the main clips of the multiple videos can be skipped in the video summary, which makes the conventional approach less effective.

In comparison to the conventional approach, a newer approach is used to create the video summary automatically by a computing device. However, the newer approach does not merge or integrate the multiple clips based on special circumstances such as the time constraint, because of which the user needs to skim through the video summary in order to grasp the content of the video summary. In the newer approach, the system needs to learn and be very accurate to understand which of the video clips has more preference or ratings. On lacking to do so, the newer approach limited to only a specific task and thereby less reliable and less efficient, which does not satisfy the requirements and needs of the user.

Hence, there is a need for an improved system and method to create a video summary upon compressing one or more videos to address the aforementioned issues.

BRIEF DESCRIPTION

In accordance with one embodiment of the disclosure, a system to compress a time frame of one or more videos is provided. The system includes one or more processors. The system also includes a video retrieve module configured to retrieve a plurality of videos from a video library database. The system also includes a video selection module configured to select at least one of the plurality of videos by a user upon viewing the plurality of videos. The system also includes a video clipping module configured to clip each of the plurality of videos into a plurality of video clips based on one or more features, using a video clipping technique. The plurality of video clips is associated to the corresponding plurality of videos. The video clipping module is also configured to select or more of the plurality of video clips by the user upon viewing the plurality of video clips. The system also includes a video summarization module configured to create a video summary upon integrating the one or more video clips of the at least one of the plurality of videos selected by the user using a building block model generated using one of an artificial intelligence technique or a machine learning technique, or a combination thereof. The system also includes a video editing module configured to operate one or more of the plurality of video clips from the video summary on receiving a feedback from the user, to generate a modified video summary to compress the one or more videos. The system also includes a video time calculator module configured to calculate total time eliminated in the modified video summary in comparison with time of the video summary. The system also includes a video timer module configured to set a time frame based on one or more instructions to enable the modified video summary to be played within the set time frame.

In accordance with another embodiment of the disclosure, a method for compressing one or more videos is provided. The method includes selecting at least one of the plurality of videos by a user upon viewing the plurality of videos. The method also includes clipping each of the plurality of videos into a plurality of video clips based on one or more features, using a video clipping technique, wherein the plurality of video clips is associated to the corresponding plurality of videos. The method also includes selecting one or more of the plurality of video clips by the user upon viewing the plurality of video clips. The method also includes creating a video summary upon integrating the one or more video clips of the at least one of the plurality of videos selected by the user using a building block model generated using one of an artificial intelligence technique or a machine learning technique, or a combination thereof. The method also includes operating one or more of the plurality of video clips from the video summary on receiving a feedback from the user, for generating a modified video summary for summarizing the one or more videos. The method also includes calculating total time eliminated in the modified video summary in comparison with time of the video summary. The method also includes setting a time frame based on one or more instructions to enable the modified video summary to be played within the set time frame.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
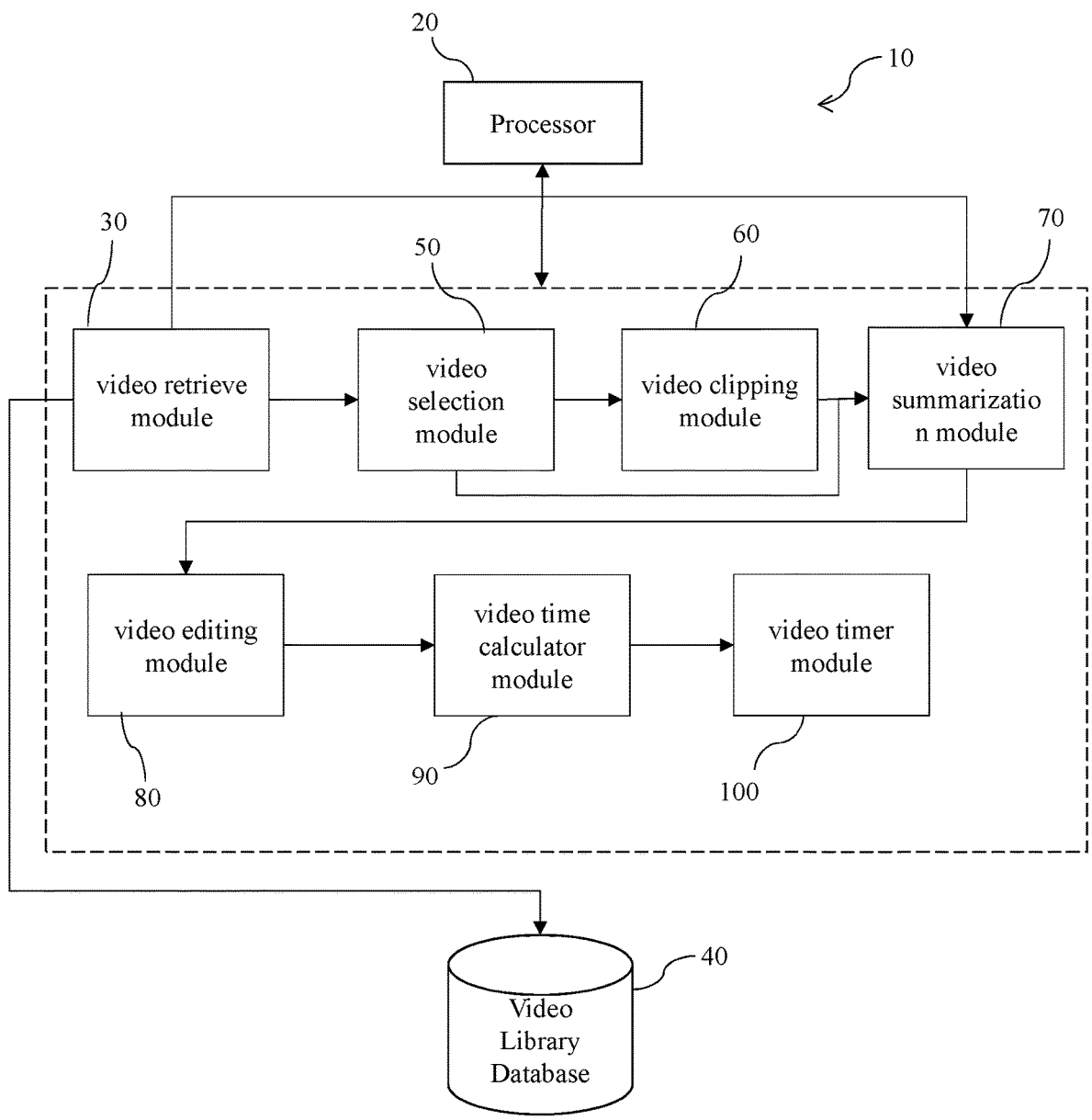
FIG. 1 is a block diagram representation of a system to compress one or more videos in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for compressing one or more videos. As used herein, the term 'video summary' may be defined as a presentation of events that enables the review of hours of video footage in a pre-defined amount of time. Also, the term 'compressed video summary' may be defined as a presentation of main events that enables the review of multiple videos within a specific time interval.

FIG. 1 is a block diagram representation of a system 10 to compress one or more videos in accordance with an embodiment of the present disclosure. The system 10 includes one or more processors 20. The system 10 also includes a video retrieve module 30 configured to retrieve a plurality of videos from a video library database 40. In one embodiment, the plurality of videos may be retrieved based on analysing one or more features of the corresponding plurality of videos from the video library database 40. In such embodiment, the one or more features may include at least one of time at which the one or more videos were captured, place in which the one or more videos were captured, event in which the one or more videos were captured, at least one of the plurality of users who have been captured in the one or more videos, or a combination thereof. In one embodiment, the plurality of videos may be retrieved by the video retrieve module 30 on receiving one or more instructions from the user. In another embodiment, the plurality of videos may be retrieved by the user from the video library database 40.

The system 10 also includes a video selection module 50 configured to select at least one of the plurality of videos by a user upon viewing the plurality of videos retrieved by the video retrieve module 30. In one embodiment, the user may select at least one of the plurality of videos based on the one or more features. In such embodiment, on retrieving the plurality of videos from the database, the user may select at least one of most appropriate or most important videos from the plurality of videos to initiate creation of video summary.

In one exemplary embodiment, the plurality of videos from the video library database 40 may be displayed on an interface of a user computing device. On reviewing the plurality of videos, the user may select the at least one of the plurality of videos. In some embodiment, the user may be a person who may be associated with the plurality of videos. In such embodiment, the user may have registered with a platform upon providing a plurality of user details. In one embodiment, the plurality of user details may include at least one of a name, age, occupation, employer, contact details/s or the like. In one exemplary embodiment, the platform may be a one of a centralized platform or a decentralized platform. In such embodiment, the decentralized platform may be one of an umbrella platform, a private platform or a public platform. Further, based on the type of platform, the corresponding plurality of users may have access for the same.

Furthermore, the system 10 includes a video clipping module 60 configured to clip each of the plurality of videos into a plurality of video clips based on the one or more features, using a video clipping technique. The plurality of video clips is associated to the corresponding plurality of videos. In one exemplary embodiment, the plurality of video clips may be created on analysing each of the at least one of the plurality of videos which may be selected and retrieved from the video library database 40 based on the one or more features using the video clipping technique. In one exemplary embodiment, the video clipping technique may be at least one of an image processing technique, voice detection technique, text detection technique, or the like.

The video clipping module 60 is also configured to select or more of the plurality of video clips by the user upon viewing the plurality of video clips. More specifically, at least one of the plurality of videos may be clipped into the corresponding plurality of video clips based on one or more parameters. The user may view the plurality of created video clips based the on one or more features, the one or more parameters, or a combination thereof. In one embodiment, the one or more parameters may include at least one of coded comments, actionable assigned tasks, one or more moments, keywords, highlights, or a combination thereof.

Furthermore, the system 10 includes a video summarization module 70 configured to create a video summary upon integrating the one or more video clips of the at least one of the plurality of videos selected by the user using a building block model generated using one of an artificial intelligence technique or a machine learning technique, or a combination thereof. As used herein, the term "artificial intelligence (AI)" is defined as an intelligence demonstrated by machines to perform or mimic human intelligence and human behavior. Also, the term "Machine learning (ML)" is defined as a study of computer algorithms that improve automatically through experience upon leaning using a built model which is based on a sample set of data. In one exemplary embodiment, the AI technique may include a natural language processing technique. In one embodiment, the ML technique may include one of a supervised technique. In operation, the video summarization module 70 creates the video summary based on one or more parameters of the one or more features of each of the plurality of videos.

The system 10 also includes a video editing module 80 which is configured to operate one or more of the plurality of video clips from the video summary on receiving a feedback from the user, to generate a modified video summary to compress the one or more videos. In one embodiment, operating of one or more of the plurality of video clips may include at least one of selecting or deselecting, or a combination thereof, of one or more of the plurality of video clips for the generation of the modified video summary. In operation, upon creation of the video summary, the user may further select at least one of the plurality of video clips to either add or subtract from the video summary to create the modified video summary upon receiving the feedback from the user. In one exemplary embodiment, the feedback from the user may include at least one of an order of preference of the plurality of video clips, order of rank of the plurality of video clips chosen by the user. In addition, the video summarization module 70 may assign a level of importance for the corresponding video summary based on at least one of the video type, one or more attributes in the video summary. The one or more attributes may include a level of the voices for one or more words used to elevate the importance of the video summary over others in the video summary In operation, on viewing each of the plurality of video clips, the user may provide the feedback for the same; further, based on the feedback provided by the user, the video editing module 80 may analyse the video summary based on the feedback using one of the AI technique, the ML technique, or the like and may modify the video summary and may produce the modified video summary. Also, in one exemplary embodiment, the feedback may include a specific time frame within which the modified video summary has to be compressed.

In one exemplary embodiment, a data model may add and/or subtract at least one of the plurality of video clips for the video summary based on the user feedback. Furthermore, total time eliminated in the modified video summary in comparison with time of the video summary is calculated by a video time calculator module 90. In one embodiment, the total time eliminated from the video summary in the modified video summary may be calculated to analyse a time saving quotient to enable a quick view of the video summary for the user or an end user.

Furthermore, the system 10 includes a video timer module 100 configured to set a time frame based on one or more instructions to enable the modified video summary to be played within the set time frame on calculating the total time eliminated by the video time calculator module 90. More specifically, when the user chooses to view the modified video summary, the video timer module 100 may initiates a timer to calculate the time of the modified video frame and may enable the modified video summary to be played in a sequential manner along with descending time frame which was initiated by the video timer module 100. Further, as the timer descents to zero or when the set time frame gets lapsed, the modified video summary which was being played may get stopped, and may notify the end of the video summary for the user.

Figure 2:
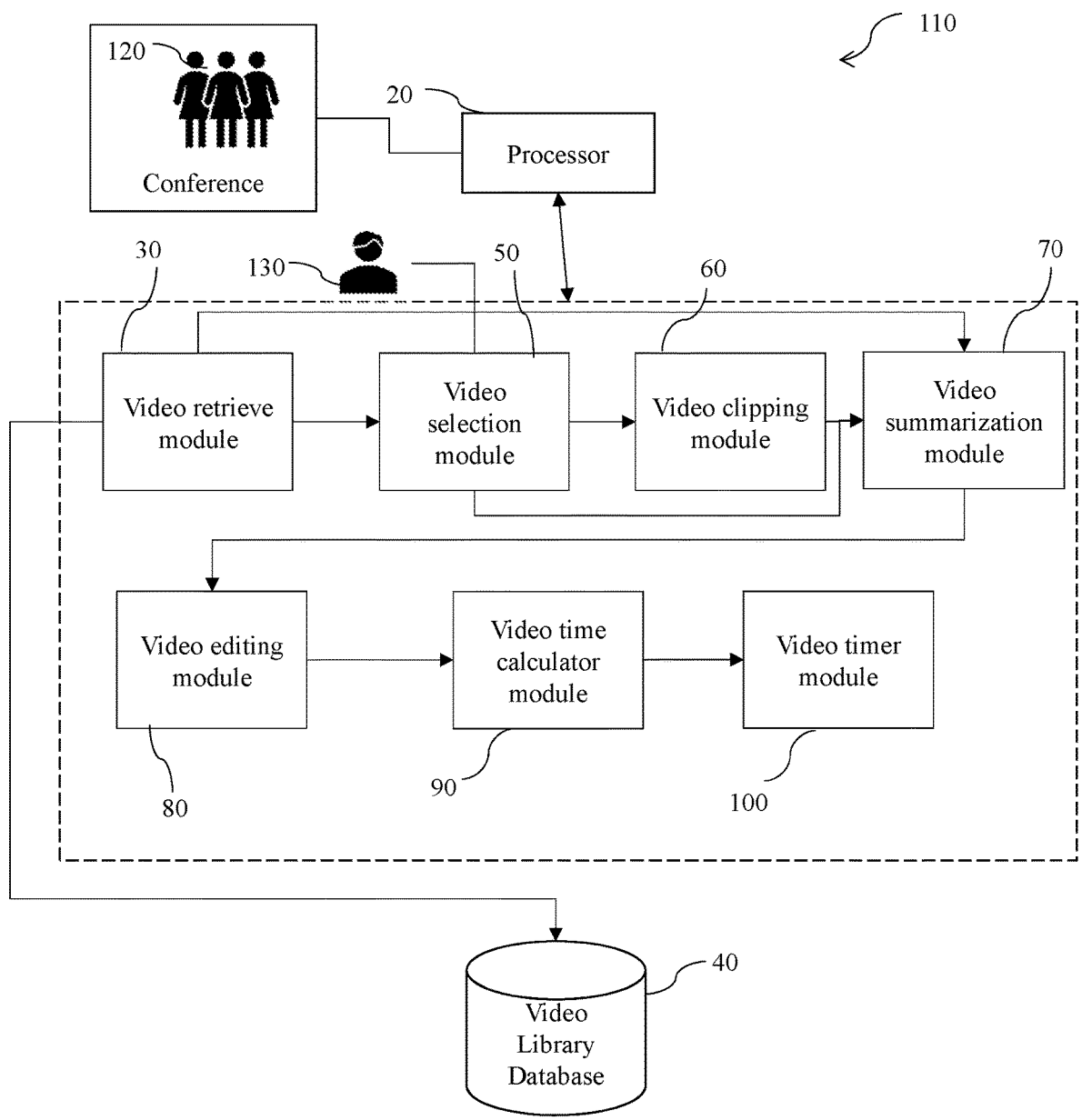
FIG. 2 is a block diagram representation of an exemplary embodiment of the system to create a compressed video summary for a conference of FIG. 1 in accordance with an embodiment of the present disclosure.

FIG. 2 is a block diagram representation of an exemplary embodiment of the system 110 to create a compressed video summary for a conference of FIG. 1 in accordance with an embodiment of the present disclosure. Multiple users 120 who have attended the conference and wish to retrieve the video summary of the conference (which we assume to be held on a day 'X' dated 'Y') would register onto the platform upon provide multiple user details via a user device 130 through a registration module 30. Further, multiple videos are uploaded to a video library database 40 through the multiple user 120 who attended the conference.

Further, the system 110 retrieved one or more videos from the video library database 40 a video retrieve module 30. The one or more videos are analysed for the relevancy among each other to verify whether the content of the videos and the transcripts belong to the conference which was held on the day X prior to being retrieved by the video retrieve module 30. On retrieving the one or more videos onto the platform, a video selection module 50 enable an authorized user 130 to select at least one of the plurality of videos based on important content of the one or more videos which may have been marked important at the conference. In addition, the one or more videos are further clipped into a plurality of video clips based on one or more features based on an ML technique. Further, the plurality of video clips may be shared with the authorized user 130 for further filtering and optimization of the video summary. Consequently, the authorized user 130 creates a ranking for each of the plurality of video clips and may transmit the same for the system 110. In addition, the authorized user 130 also sets a time frame for the system 110 to fit the video summary within the time frame upon selecting the plurality of vide clips based on the ranking provided by the authorized user 130, by a video summarization module 70 and a video editing module 80.

Subsequently, based on the ranking of the each of the plurality of video clips, the building block model creates the video summary within the set time frame. Also, based on total time eliminated, from a main video summary to the video summary which may be created by the plurality of video clips by a video time calculator module 90, further to which a video timer module 100 starts to calculate the time upon initiating a timer, when the video summary is initiated by the authorized user 130. Consequently, the plurality of video clips is played in a sequentially. Further, as the set time frame expires, the video timer module 100 stops playing the video summary.

It should be noted that, all the above-described modules of FIG. 2 are operable by one or more processors 20. Furthermore, the system 110, the video retrieve module 30, the video library database 40, the video selection module 50, the video clipping module 60, the video summarization module 70, the video editing module 80, the video time calculator module 90 and the video timer module 100 of FIG. 2 are substantially similar to system 10, one or more processors 20, a video retrieve module 30, a video library database 40, a video selection module 50, a video clipping module 60, a video summarization module 70, a video editing module 80, a video time calculator module 90 and a video timer module 100 of FIG. 1, and all the embodiments described in FIG. 1 applies to corresponding modules of FIG. 2.

Figure 3:
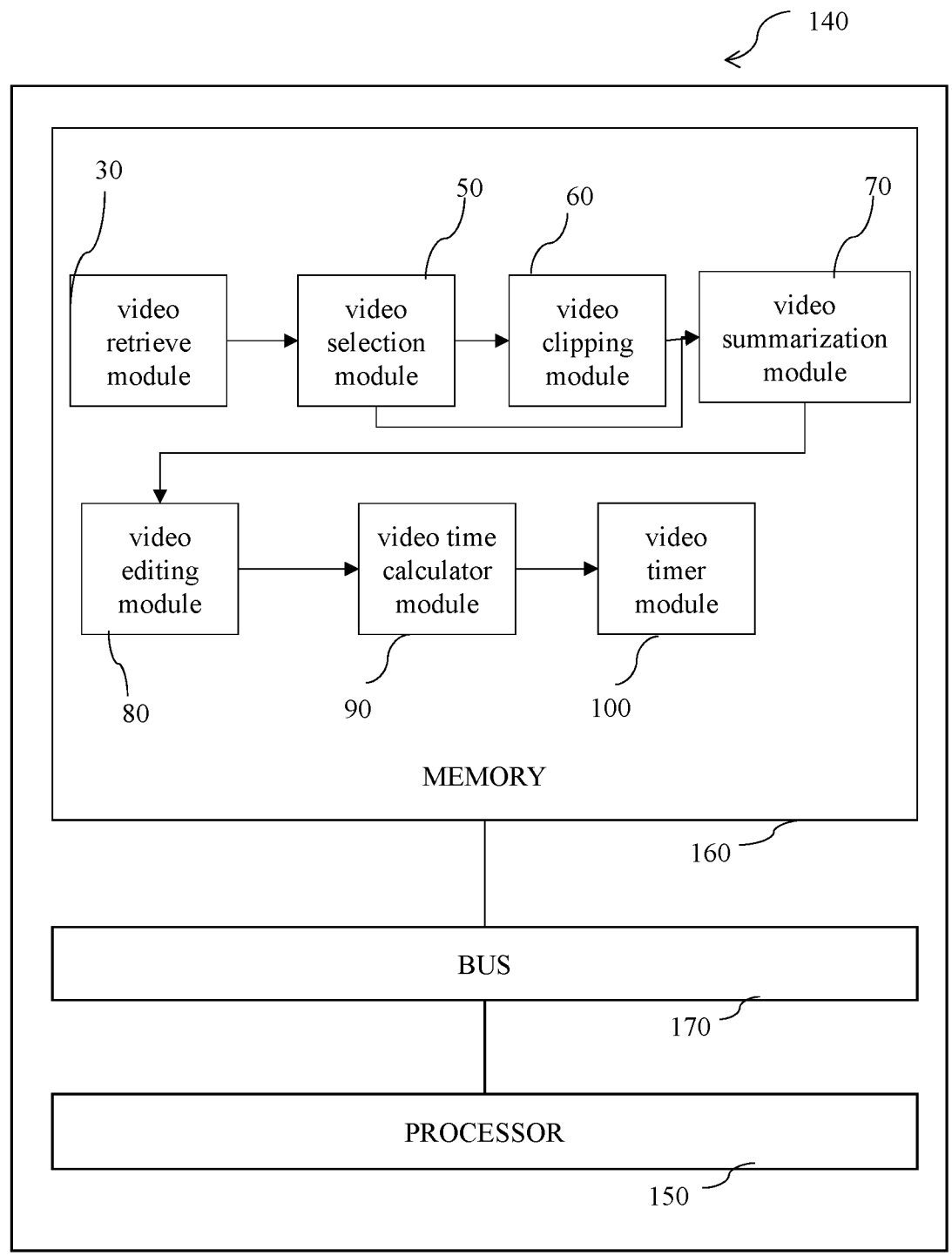
FIG. 3 is a block diagram representation of a processing subsystem located on a local server or on a remote server in accordance with an embodiment of the present disclosure.

FIG. 3 is a block diagram representation of a processing subsystem located on a local server or on a remote server in accordance with an embodiment of the present disclosure. The server 140 includes processor(s) 150, and memory 160 operatively coupled to the bus 170.

The processor(s) 150, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 4A:
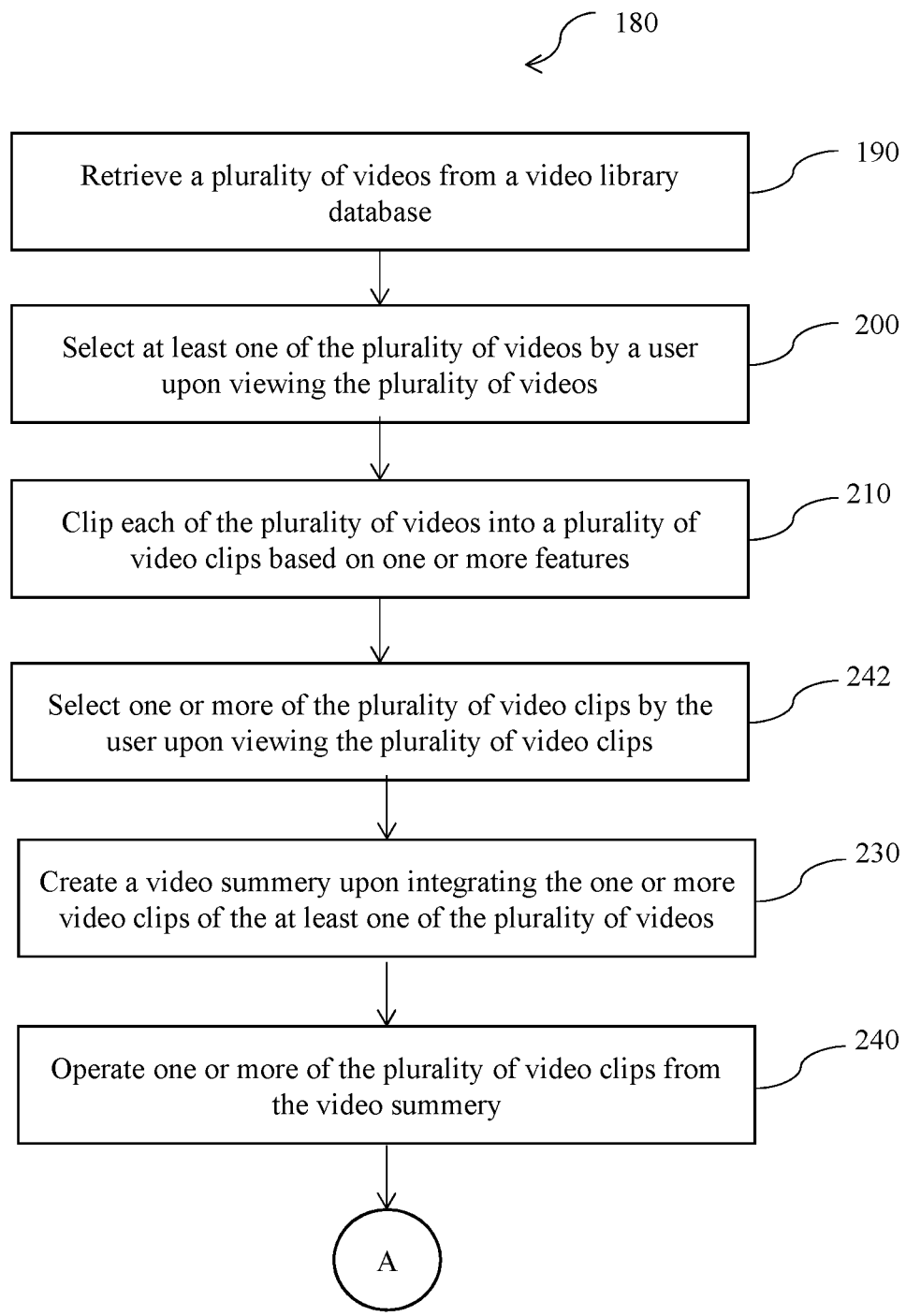
FIG. 4a and FIG. 4b are flow charts representing steps involved in a method for compressing one or more videos in accordance with an embodiment of the present disclosure.
Figure 4B:
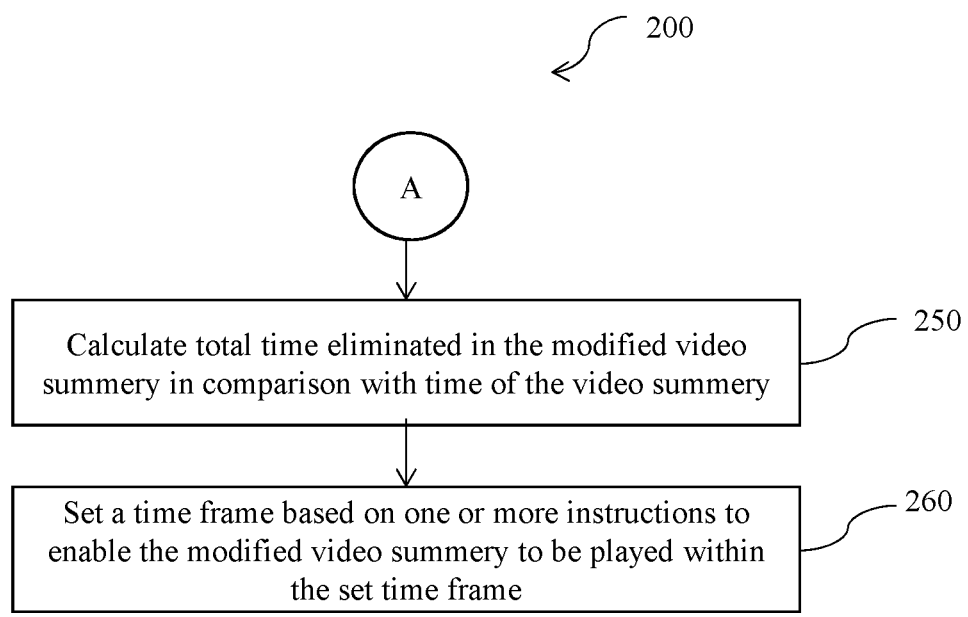

The memory 160 includes a plurality of modules stored in the form of executable program which instructs the processor 150 to perform the method steps illustrated in FIG. 4a and FIG. 4b. The memory 160 is substantially similar to the system 10 of FIG. 1. The memory 160 has the following modules: a video retrieve module 30, a video library database 40, a video selection module 50, a video clipping module 60, a video summarization module 70, a video editing module 80, a video time calculator module 90 and a video timer module 100.

The video retrieve module 30 is configured to retrieve a plurality of videos from a video library database. The video selection module 50 configured to select at least one of the plurality of videos by a user upon viewing the plurality of videos. The video clipping module 60 is configured to clip each of the plurality of videos into a plurality of video clips based on one or more features, using a video clipping technique and to select or more of the plurality of video clips by the user upon viewing the plurality of video clips. The video summarization module 70 is configured to create a video summary upon integrating the one or more video clips of the at least one of the plurality of videos selected by the user using a building block model. The video editing module 80 is configured to operate one or more of the plurality of video clips from the video summary on receiving a feedback from the user, to generate a modified video summary to compress the one or more videos. The video time calculator module 90 is configured to calculate total time eliminated in the modified video summary in comparison with time of the video summary. The video timer module 100 is configured to set a time frame based on one or more instructions to enable the modified video summary to be played within the set time frame on calculating the total time eliminated.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s).

FIG. 4a and FIG. 4b are flow charts representing steps involved in a method 180 for compressing one or more videos in accordance with an embodiment of the present disclosure. The method 180 includes retrieving a plurality of videos from a video library database in step 190. In one embodiment, retrieving the plurality of videos may include retrieving the plurality of videos by a video retrieve module.

The method 180 also includes selecting at least one of the plurality of videos by a user upon viewing the plurality of videos in step 200. In one embodiment, selecting the at least one of the plurality of videos may include selecting the at least one of the plurality of videos by a video selection module.

Furthermore, the method 180 includes clipping each of the plurality of videos into a plurality of video clips based on one or more features, using a video clipping technique, wherein the plurality of video clips is associated to the corresponding plurality of videos in step 210. In one embodiment, clipping each of the plurality of videos may include clipping each of the plurality of videos by a video clipping module. In one exemplary embodiment, clipping each of the plurality of videos may include clipping each of the plurality of videos by at least one of time at which the one or more videos were captured, place in which the one or more videos were captured, event in which the one or more videos were captured, at least one of the plurality of users who have been captured in the one or more videos, or a combination thereof.

The method 180 also includes selecting one or more of the plurality of video clips by the user upon viewing the plurality of video clips in step 220. In one embodiment, selecting the one or more of the plurality of video clips may include selecting the one or more of the plurality of video clips by the video clipping module.

The method 180 also includes creating a video summary upon integrating the one or more video clips of the at least one of the plurality of videos selected by the user using a building block model generated using one of an artificial intelligence technique or a machine learning technique, or a combination thereof in step 230. In one embodiment, creating the video summary may include creating the video summary by a video summarization module.

Furthermore, the method 180 includes operating one or more of the plurality of video clips from the video summary on receiving a feedback from the user, for generating a modified video summary for summarizing the one or more videos in step 240. In one embodiment, operating the one or more of the plurality of video clips may include operating the one or more of the plurality of video clips by a video editing module. In one embodiment, operating of one or more of the plurality of video clips may include operating at least one of selecting or deselecting, or a combination thereof, of one or more of the plurality of video clips for the generation of the modified video summary. In one exemplary embodiment, the feedback from the user comprises at least one of an order of preference of the plurality of video clips, order of rank of the plurality of video clips chosen by the user. In one specific embodiment, the plurality of video clips is played in a sequential manner based on the feedback chosen by the user to fit the plurality of video clips within the set time frame.

The method 180 includes calculating total time eliminated in the modified video summary in comparison with time of the video summary in step 250. In one embodiment, calculating the total time may include calculating the total time by a video time calculator module.

The method 180 also includes setting a time frame based on one or more instructions to enable the modified video summary to be played within the set time frame in step 260. In one embodiment, setting the time frame may include setting the time frame by a video timer module.

Various embodiments of the present disclosure enable the system to provide a platform to create the video summary by integrating multiple video clips for a specific time frame based on multiple parameters and multiple features. Also, the system enables the user to review and modify the video summary as per their needs, requirements or the like by providing a feedback and setting the time frame as required by the end user.

Also, since the system uses the machine learning technique and the artificial intelligence technique, the system is more reliable as it learns from every built video summary, thereby making the system understand and provide most accurate video summary and video clips for the users to generate the feedback and set the time frame, thereby, the system is highly reliable and highly efficient.

Since the system provides the video summary for a specific time frame, the system provides an opportunity for the user or the end user to obtain the important or the complete gist of the multiple videos thereby saving the viewing and reviewing time of the end user, which makes the system provide a unique approach for the video summary.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for compressing one or more videos, the system comprising:
   one or more processors;
   a video retrieve module, operable by the one or more processors, configured to retrieve a plurality of videos from a video library database;
   a video selection module, operable by the one or more processors, configured to receive a selection from a user of at least one of the plurality of videos retrieved by the video retrieve module;
   a video clipping module operable by the one or more processors, and configured to:
     clip each of the plurality of videos selected into a plurality of video clips based on one or more features; and
     receive a selection from the user of one or more of the plurality of video clips;
   a video summarization module, operable by the one or more processors, configured to create a video summary upon integrating the plurality of video clips using a building block model;
   a video editing module, operable by the one or more processors, configured to operate on one or more of the plurality of video clips integrated in the video summary based on feedback input received from the user, the operation generating a modified video summary compressing one or more videos;
   a video time calculator module, operable by the one or more processors, configured to calculate a total time eliminated in the modified video summary in comparison with time associated with the video summary; and
   a video timer module, operable by the one or more processors, configured to set a time frame based at least in part on the total time eliminated by the video time calculator module, enabling the modified video summary to be played within the set time frame.

2. The system of claim 1, wherein the one or more features comprises a time at which the one or more videos were captured, a place in which the one or more videos were captured, an event in which the one or more videos were captured, at least one of the plurality of users captured in the one or more videos, or a combination thereof.

3. The system of claim 1, wherein operating on one or more of the plurality of video clips comprises selecting or deselecting, or a combination thereof, of one or more of the plurality of video clips for the generation of the modified video summary.

4. The system of claim 1, wherein the feedback input from the user comprises an order of preference of the plurality of video clips or an order of rank of the plurality of video clips.

5. The system of claim 1, wherein the plurality of video clips is played in a sequential manner based on the feedback input from the user to enable playback of the plurality of video clips to fit within the set time frame.

6. A method of compressing one or more videos, the method comprising:
   retrieving, by a video retrieve module, a plurality of videos from a video library database;
   receiving, by a video selection module, a selection of at least one of the plurality of videos;
   clipping, by a video clipping module, each of the plurality of videos selected into a plurality of video clips based on one or more features;
   receiving, by the video clipping module, a selection of one or more of the plurality of video clips;
   creating, by a video summarization module, a video summary upon integrating the plurality of video clips using a building block model;
   operating, by a video editing module, on one or more of the plurality of video clips integrated in the video summary based on a feedback input received from the user, the operation generating a modified video summary compressing the one or more videos;
   calculating, by a video time calculator module, a total time eliminated in the modified video summary in comparison with time associated with the video summary; and
   setting, by a video timer module, a time frame based at least in part on the total time eliminated, enabling the modified video summary to be played within the set time frame.

7. The method of claim 6, wherein the one or more features comprises a time at which the one or more videos were captured, a place in which the one or more videos were captured, an event in which the one or more videos were captured, at least one of the plurality of users captured in the one or more videos, or a combination thereof.

8. The method of claim 6, wherein operating on one or more of the plurality of video clips comprises selecting or deselecting, or a combination thereof, of one or more of the plurality of video clips for the generation of the modified video summary.

9. The method of claim 6, wherein the feedback input from the user comprises an order of preference of the plurality of video clips or an order of rank of the plurality of video clips.

10. The method of claim 6, wherein the plurality of video clips is played in a sequential manner based on the feedback input from the user to enable playback of the plurality of video clips to fit within the set time frame.

* * * * *